C. F. BAKE.
Car-Coupling.

No. 160,294.  Patented March 2, 1875.

Witnesses:
Platt R. Richards.
A. McCallum

Inventor:
Cyrus F. Bake,
by W. B. Richards,
Atty.

UNITED STATES PATENT OFFICE.

CYRUS F. BAKE, OF YOUNG AMERICA, ILLINOIS.

IMPROVEMENT IN CAR-COUPLINGS.

Specification forming part of Letters Patent No. 160,294, dated March 2, 1875; application filed February 9, 1874.

*To all whom it may concern:*

Be it known that I, CYRUS F. BAKE, of Young America, county of Warren and State of Illinois, have invented certain Improvements in Car-Couplings, of which the following is a specification; and I do hereby declare the following to be a full, clear, and exact description thereof, reference being had to the accompanying drawing, in which—

Figure 3:
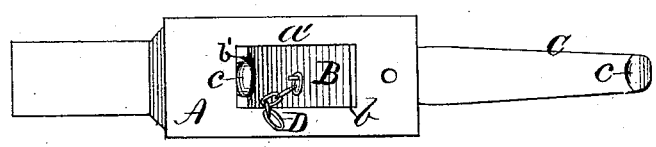
Figure 2:
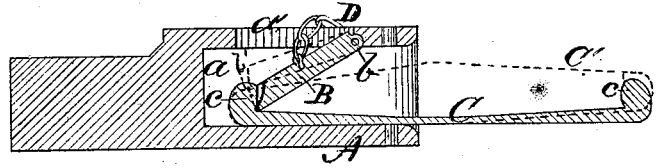
Figure 1:
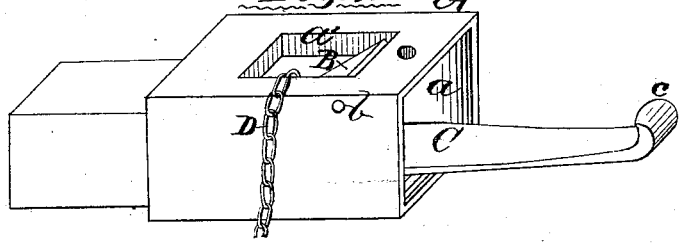

Figure 1 is a perspective view of my improved coupling. Fig. 2 is a longitudinal vertical section of the same, and Fig. 3 is a top-plan view of the same.

My invention relates to devices for coupling railway-cars; and it consists in a new and improved automatic coupling, consisting of a draw-head, carrying a hinged locking-bar, fitting accurately an aperture in the upper side of the draw-head, in which it is hinged, and which it completely closes when elevated, the free end of the locking-bar recessed to correspond with the arc of vibration of the coupling-link, and to facilitate the release of the link when desired, and the bottom of the draw-head presenting a straight surface for some distance for sustaining the coupling-link with greater security, the coupling-link being so constructed that, should either car be turned over, the link will be released from the coupling.

Referring to the drawings by letters, letter A represents the draw-head, having a rectangular interior chamber, a, the opening or mouth of which may be flared in the usual manner, to facilitate the entrance of the coupling-link. On the upper side is a rectangular slot, a', in which is a locking-bar, B, hinged at one end to the front end of the slot a' at b, its other end being free to rise and fall within the chamber a. Its free end is cut with an arc-shaped groove, b', and beveled as shown. D is a chain attached to the upper side and free end of the bar B, by which said bar may be raised to uncouple the cars when desired. Other devices may be substituted for the chain, if desired. C is the coupling-link, formed of a flat straight bar, enlarged laterally and tapered to its ends, and provided with dogs or hooks c c—one on each of its ends, as shown in the drawings; or it may be a crooked link, for use between cars of different height. When the link C is inserted in the draw-head, as shown at Fig. 2, the weight of the bar B, aided by the straight supporting-bottom of the draw-head, is sufficient to hold it in the position shown for entering the adjacent draw-head until the dog c on its end rises and passes beneath and beyond the bar B therein, which drops in front and holds it securely until the lock-bar is lifted, or else the link turns upon its side, as shown by dotted lines at Fig. 2, either by hand or by the turning of the draw-heads, or either of them, from the turning over of either car. D is a hole for a pin to couple with the ordinary link-coupling. The arc-shaped recess b' in the end of the locking-bar B will tend to retain the dog c on the end of the link C in its proper central position on the bar B, and to fit accurately, as the link is oscillated by the motion of the cars, while, at the same time, its beveled face permits the locking-bar to be raised while it and the dog are in close proximity. The bar B being constructed also to fit the aperture a' snugly, it may be raised to close the same from rain, ice, sleet, &c., when desired.

I claim—

The draw-head A, having a straight bottom, and the locking-bar B combined therewith, and hinged in the aperture a', which it accurately fits, and provided with the arc-shaped recess b', to operate with the straight coupling-link C, having dogs c on its ends, substantially as and for the purpose specified.

CYRUS F. BAKE.

Witnesses:
J. J. TUNNICLIFF,
P. R. RICHARDS.